United States Patent [19]

McNair et al.

[11] 4,309,107

[45] Jan. 5, 1982

[54] LASER GYRO DITHER MECHANISM

[75] Inventors: Fred McNair, Woodland Hills; Thomas M. Wirt, Malibu, both of Calif.

[73] Assignee: Litton Systems, Inc., Beverly Hills, Calif.

[21] Appl. No.: 111,154

[22] Filed: Jan. 11, 1980

[51] Int. Cl.³ .......................... G01C 19/64; F16F 7/10
[52] U.S. Cl. .................................. 356/350; 188/380; 248/559
[58] Field of Search ....................... 356/350; 248/559; 188/1 B; 267/160

[56] References Cited

U.S. PATENT DOCUMENTS

| | | | |
|---|---|---|---|
| 3,464,657 | 9/1969 | Bullard | 248/550 |
| 4,085,825 | 4/1978 | Scarborough | 118/1 B |
| 4,115,004 | 9/1978 | Hutchings et al. | 356/350 |
| 4,152,072 | 5/1979 | Hutchings et al. | 356/350 |

*Primary Examiner*—Vincent P. McGraw
*Attorney, Agent, or Firm*—Roy L. Brown

[57] ABSTRACT

An improved laser gyro dither mechanism is shown utilizing a three-spring suspension system which isolates dither vibrational energy generated within the gyro and prevents that energy from passing to the mounting case of the laser.

8 Claims, 7 Drawing Figures

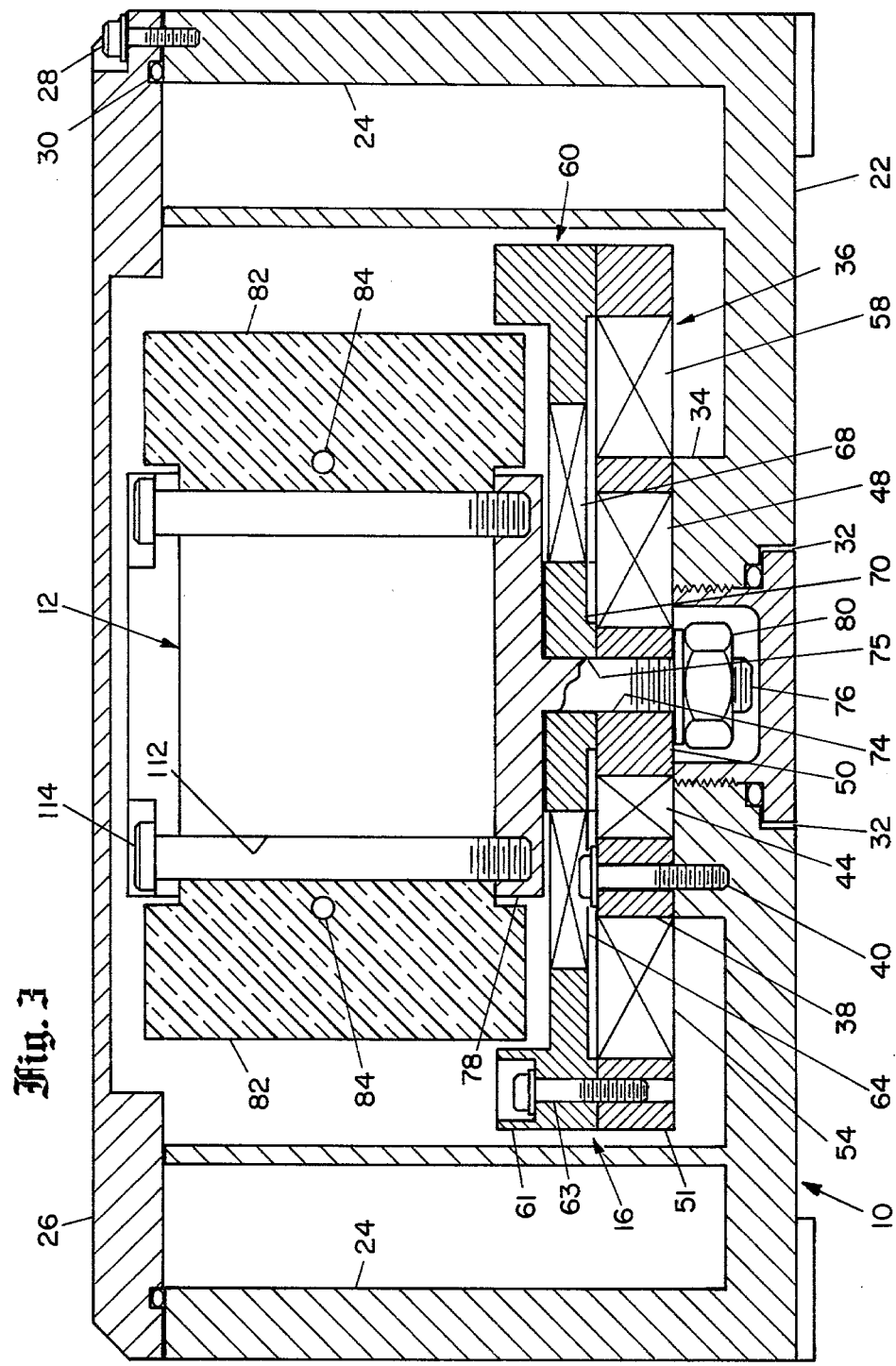

LASER GYRO DITHER MECHANISM

FIELD OF THE INVENTION

This invention relates to laser gyroscopes that employ a drive mechanism to introduce a rotational movement about a central axis in a clockwise and counterclockwise direction to create a so-called "dither" movement and, more particularly, to an improved arrangement for isolating the vibrational energies caused by such dither movement.

BACKGROUND OF THE INVENTION

The avoidance of mode locking in laser gyroscopes through the use of mechanically vibrated or individually dithered mirrors is known in the art. Mode locking is the tendency of two counter rotating beams of ring laser radiation (hereinafter called "light") to appear to have the same frequency at low levels of angular velocity due to noise or light scattering, thus causing a loss of the desired beat frequency. It is also known in the art to dither or rotate the entire laser gyroscope in order to prevent mode locking. Dithering of the mirror or the entire gyro causes vibrations which, if transmitted to the case, can interfere with the input or output of other instruments or gyros within a navigational system in which the first gyro is utilized. Elimination of this vibration problem is accomplished by the utilizion of a isolation arrangement within each gyro. An example of a isolation system which reduces the vibrational energy of an oscillating gyro may be found in U.S. Pat. No. 4,115,004 by Hutchings et al. which issued on Sept. 19, 1978 and is assigned to the assignee of the present invention.

The isolation system shown within the Hutchings et al. '004 patent utilizes a dual spring system which mounts a counterweight for isolating the oscillatory motion of the gyro. This spring system includes a first set of springs mounted between the frame or case and the gyro and a second set of springs mounted between a case and the counterweight. The dual spring system of Hutchings et al. '004 works well under some conditions but is not a practical system under all operating conditions, such as temperature variations, due to the need to match the springs precisely in each system. The dual system can be fine tuned in the laboratory; but, as temperatures vary, the tuning is lost causing an increased amount of vibrational energy to be transmitted to the case of the gyro. One reason it is difficult to tune a dual spring system is because the gyro case must be attach precisely at the node between the two spring systems. The present invention reduces this problem by attaching the node to the case through a third spring system wherein the point of attachment need not be as accurate as in a dual spring system.

A prior art example of a single spring system used to isolate vibrational energy from an aircraft instrument is shown in U.S. Pat. No. 3,464,657 by Bullard which issued on Sept. 2, 1969 and is assigned to the United States of America. In this system, the single set of springs is connected between the frame and the mounting platform which, in the present invention, is the equivalent of the gyro.

While the preferred embodiment described hereinbelow describes a ring laser gyro utilizing a rectangular laser path, it will be understood that gyros utilizing triangular laser paths are also known and that the present invention is not intended to be limited by the description of a rectangular path. A ring gyro laser utilizing a triangular laser path is described in U.S. Pat. No. 4,152,072 by Hutchings which issued on May 1, 1979 and is also assigned to the assignee of the present invention.

For a more basic discussion of the operation of ring laser gyros, attention is directed to a text book entitled *Laser Applications*, edited by Monte Ross, Academic Press, Inc., New York, New York 1971.

SUMMARY OF THE INVENTION

The present invention utilizes a three-spring system for first mounting a gyro to a housing or case, second mounting the gyro to a counterweight, and third mounting the counterweight to the case. Through this arrangement, it is possible to significantly isolate all angular vibrational energy which would otherwise pass to the case of a laser. It is undesirable to utilize the case of the laser to provide a reaction to the inertia of oscillation within the laser for several reasons. First, if a ring laser gyro were utilized with two other laser gyros and three linear accelerometers to complete a navigational system wherein each laser provides angular velocity information about one axis within the three-dimensional system, the mass of the mounting case for the three gyros would need to be far in excess of the mass of the instruments to obtain proper isolation. Second, the three gyros would to be tuned to separate frequencies to avoid having one act as a vibration absorber for another. Third, external input of vibrational energy would disturb the dither response within each gyro. Finally, linear accelerometers within the system utilizing the three gyros do not tolerate the levels of vibration generated should be frame be utilized as a damping mass.

The dual spring system of the prior art, as demonstrated by the Hutchings et al '004 patent, has several conceptual problems. That is, two independent spring masses are created which are common only at the case attachment. Precision tuning, on the order of one in a thousand, of one spring mass system relative to the other is required. While this can be accomplished for a given temperature, it is not achievable over a wide range of temperatures without the utilization of exotic and expensive materials.

A more satisfactory solution is to decouple the node from the case such that there is only one principal resonance, namely the two-mass one-spring free resonance. This leaves the problem of how to connect the spring or masses to the case. A reasonable solution might be elastically to connect the node of the single spring system to the case. The elastic connection, in effect, becomes a third spring system arranged in a Y-configuration. If the spring rate of the third spring is within ten percent of the combined spring rates of the first two springs and the node is located within 10% of the attachment point, then the vibration transmitted from the ring laser gyro to the case is within one percent of the original value. However, the mounting arrangement for an elastically connected node using the Y-configuration described herein leads to undesirable structural problems such as insufficient translational stiffness.

Another approach to solving the problem of transmission of angular vibratory energy to the case is to create a "phony node". This may be accomplished by joining the masses created by the counterweight and the gyro with a spring system and joining the counterweight to the case with a second spring system while joining the gyro to the case with a third spring system. In effect, the frame is located at a node between the two masses. There is no analytical difference between the two examples given above except that one example is connected in a Y-configuration, while the other example is connected in a delta-configuration. A dither drive motor can be connected between the masses of the counterweight and gyro or it can be connected between one of these masses and the case. The reaction torque from the motor, as seen by the case, is negligible compared to the resonant torque due to the Q of the system. If the motor is connected from one mass to the case, it can be used to damp the total spring mass to case resonance.

Accordingly, it is an object of this invention to provide an improved laser gyro dither mechanism.

Another object is to provide a vibration isolation system, for use within a laser gyro, which is unaffected by temperature or other changes.

It is yet another object to provide a three spring vibration isolation system which functions over a wide range of temperatures.

BRIEF DESCRIPTION OF THE DRAWINGS

FIG. 3 is a side view, shown in cross-section, of a typical ring laser gyroscope incorporating the present invention;

DETAILED DESCRIPTION

Figure 1:
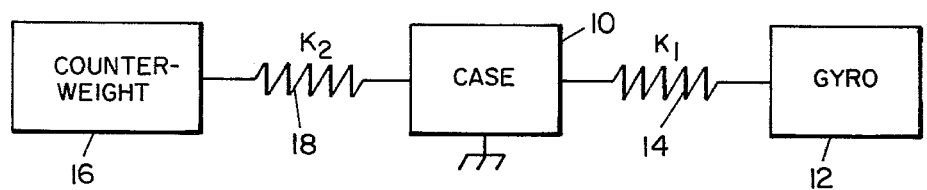
FIG. 1 is a schematic representation showing the dual spring system of the prior art.
Figure 2:
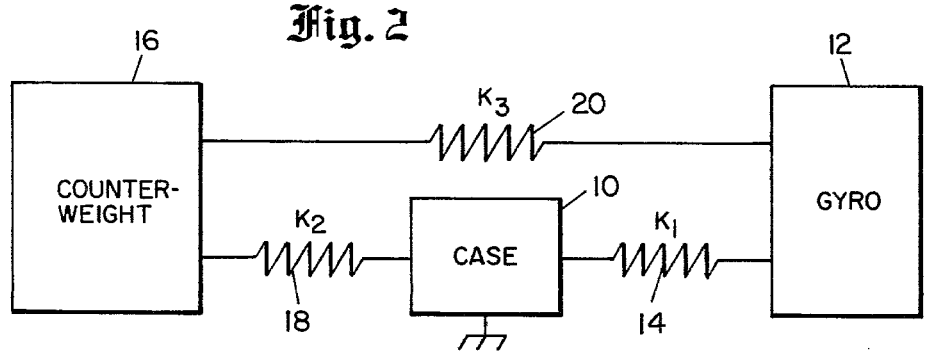
FIG. 2 is a schematic representation showing the triple spring system of the present invention.

FIG. 1 shows a dual spring system utilized within the prior art such as the Hutchings et al '004 patent. It is understood that the linear system shown also illustrates an angular system and that the present invention should not be limited to an angular or linear system as it is equally applicable to both. In this arrangement, the housing or case 10 is attached to the ring laser gyro 12 by a first spring system 14 illustrated at k1. The case 10 is also attached to the counterweight 16 by a second spring system 18 illustrated as k2. In FIG. 2, a similar schematic represents the improvement envisioned by the present invention. That is, the case 10 connects to the gyro 12 through a first spring system k1 while the case connects to the counterweight 16 through a second spring system k2. The counterweight 16 in turn connects to the gyro 12 through a third spring system 20 illustrated as k3. It may now be noted that the series combination of spring systems k1 and k2 is attached to the case 10 at the node formed by that series of springs.

Referring to FIG. 3, the preferred embodiment will be described with further reference to FIGS. 4 and 5. Case 10 is formed from a flat rectangularly-shaped base 22 having sidewalls 24 that form a cavity which is closed by a rectangular cover 26 secured to the sidewalls 24 by screws 28 and sealed by O-ring 30. Rectangular base 22 is provided with an aperture 32 surrounded by a toroidally-shaped mounting collar 34. Mounted upon the collar 34 is first flexure plate 36 which incorporates the first and second spring systems 14 and 18, respectively, as can best be seen in FIG. 6.

The flexure plate 36 consists of a first middle toroidal mounting ring 38 which is coaxially arranged with the case collar 34 and attached thereto by a plurality of screws 40, whereby the middle ring 38 becomes part of the case 10. The first spring system 14 is comprised of four radially, inwardly directed webs 42, 44, 46, and 48 which attach the first middle toroidal ring 38 to an inner mounting hub 50 to which is mounted the gyro 12, FIG. 5. The first middle toroidal ring is also attached to an outer toroidal ring 51 by the second spring system 18 formed from four webs 52, 54, 56, and 58 which radiate from the first toroidal ring 38 outwardly toward the outer segmented toroidal ring 51. The outer toroidal ring 51 forms part of the counterweight 16 as will be described below.

Figure 7:
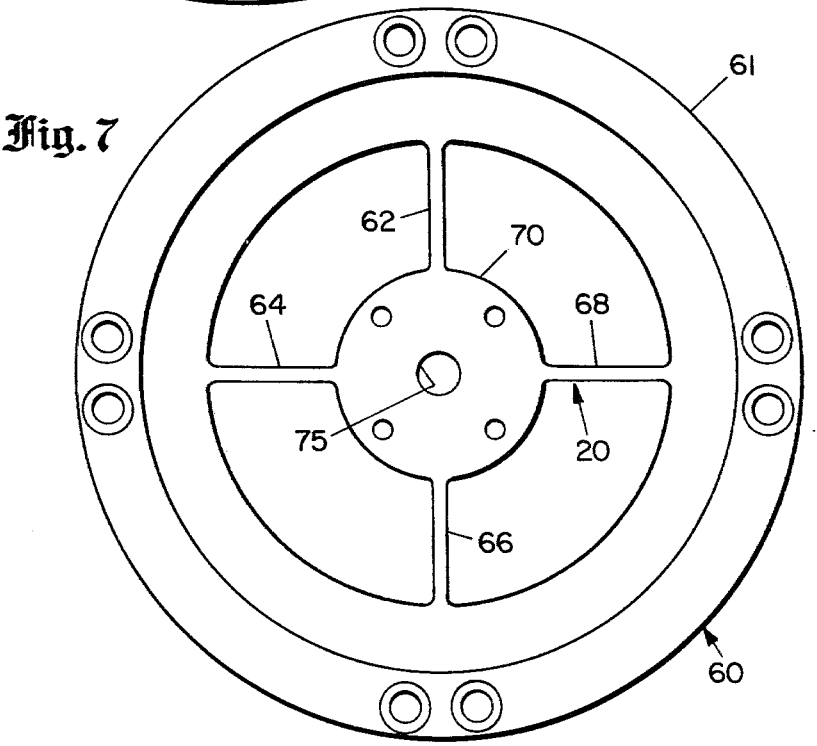
FIG. 7 is a top plan view showing the counterweight and third spring systems of the present invention.

Mounted to the first flexure plate 36 is a second flexure plate 60 having an outer toroidal ring 61 which is coaxially arranged with the outer toroidal ring 51 of the first flexure plate. The outer toroidal ring 61 is connected via the third spring system 20 formed by radially, inwardly-directed webs 62, 64, 66, and 68 to an inner hub 70 which is coaxially arranged with the inner hub 50 of the first flexure plate. The second flexure plate 60 is best seen in FIG. 7.

The outer toroidal ring 61 of the second flexure plate 60 forms the second mass of the counterweight 16. This ring 61 is attached to the outer toroidal ring 51 by a plurality of screws 63. Each flexure plate 36 and 60 has a centrally located aperture 74 and 75, respectively, through which passes a flexure stud 76 which extends from the lower surface of a gyro mounting platform 78. The outermost end of the stud 76 is threaded to receive a hex nut 80 which, in combination with screws 63 and 72, unite the first and second flexure plates 36 and 60 into a suspension assembly. The mounting screws 72 pass through the inner hub 70 into the inner mounting hub 50, as best seen in FIG. 5.

Mounted upon the gyro-mounting plate 78 is the gyro 12 which may be formed within a body 82, such as quartz, constructed with four passageways 84 arranged within the body 82 to form a rectangular laser path. The passageways 84 are sealed to retain a gas mixture consisting of approximately 90% helium and 10% neon at a vacuum of approximately 3 torr, it being understood that atmospheric pressure is approximately 760 torrs.

Figure 4:
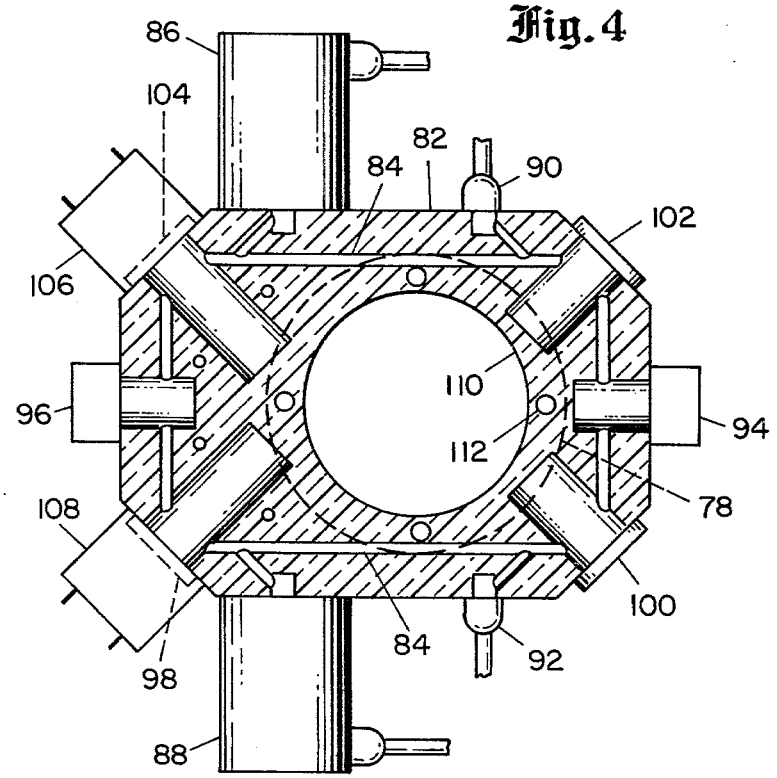
FIG. 4 is a top plan view, partially in section, showing a typical ring laser which may be utilized in the present invention.

In accordance with known laser practice, the body 82, as best seen in FIG. 4, is provided with two cathodes 86 and 88 and two anodes 90 and 92 which are secured to the body in a manner which is well-known in the art. A gas discharge is established between cathode 86 and anode 90 in passageway 84 as well as between cathode 88 and anode 92. Getters 94 and 96 are provided at opposite ends of a body to absorb impurities found within the gas in passageway 84. Mirrors 98, 100, 102 and 104 are located at the four corners of the optical path formed within the passageway 84 of the ring gyro 12 wherein two of the mirrors 104 and 98 are mounted upon photo-detection output devices 106 and 108, respectively. The photo-detection devices measure the beat frequency of the oppositely rotating electromagnetic energy formed by the two counter rotating light beams to indicate the rotation of the ring laser gyro 12.

Figure 5:
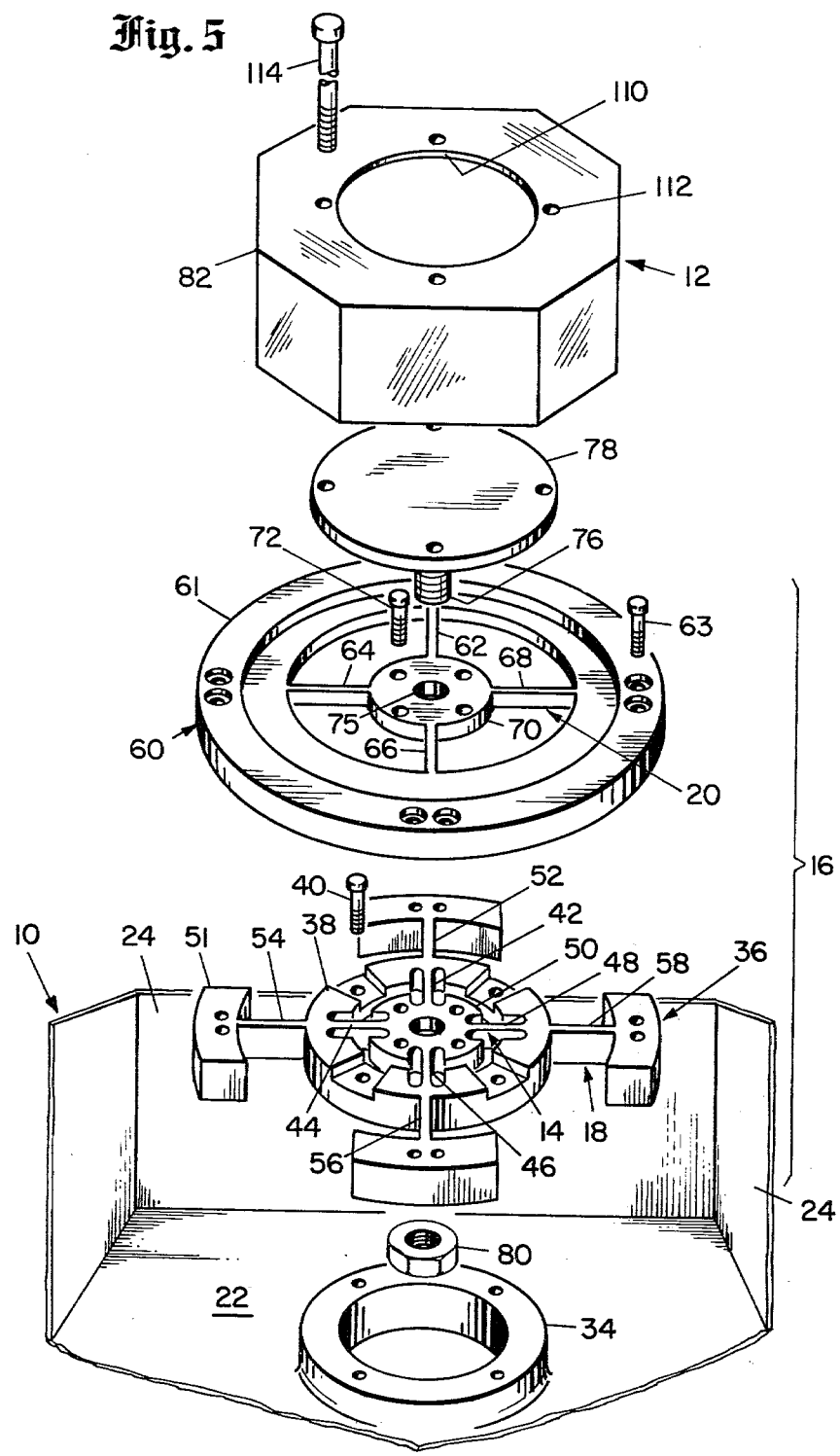
FIG. 5 is an exploded view showing a ring laser gyro which incorporates the present invention.

As shown in FIG. 5, the body 82 is provided with a central aperture 110 into which may be mounted a suitable torque motor for driving the ring laser gyro. Located about the periphery of the aperture 110 are clearance holes 112 that receive mounting screws 114, which pass through the body 82 into the gyro mounting platform 78, for securing the laser gyro 12.

Figure 6:
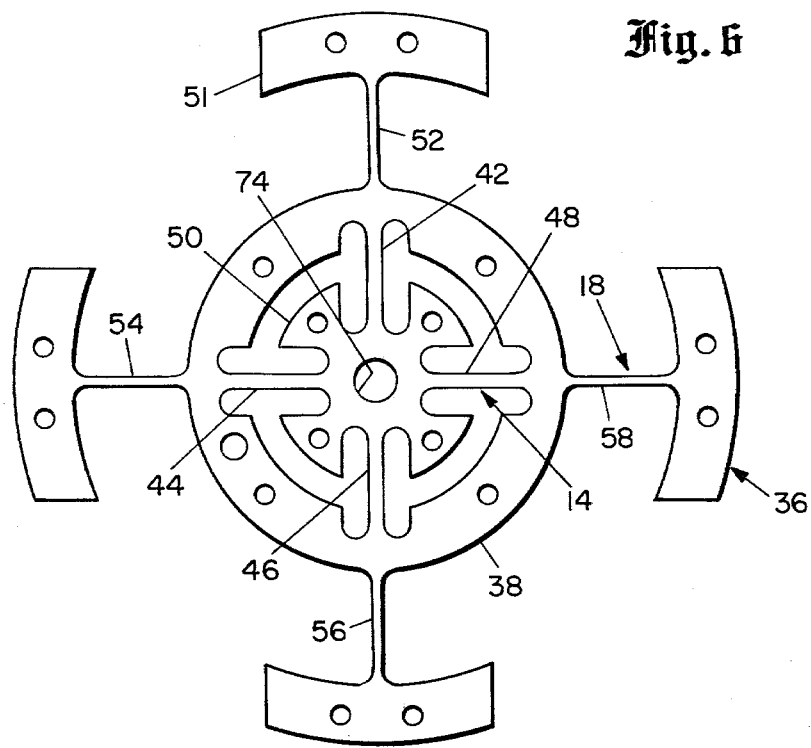
FIG. 6 is a top plan view showing the counterweight and first and second spring systems of the present invention.

It will be understood by those skilled in the art, after reviewing FIGS. 6 and 7, that the flexure plates 36 and 60 may be manufactured, by appropriate milling operations, with several variations from flat stainless steel plates or castings. For example, the outer toroidal ring 51 shown in FIG. 6 as four broken segments may be constructed as a continuous ring. Further, the various shoulders may be eliminated to reduce manufacturing costs.

The three spring system of the present invention can be formed as either a Y-configuration or a delta-configuration. The delta-configuration is preferred over the Y-configuration as the Y-configuration leaves the masses formed by the counterweight, gyro and case unsupported at the end of each extended spring system. That is, the mass of a counterweight is supported in a cantilevered arrangement, as is the mass of the gyro and case, at the end of its spring system. However, when the three spring system is arranged in a delta-configuration each mass, including the counterweight, gyro and case, is connected by two spring systems of the three into a triangular configuration which, it will be remembered, is the strongest geometric form.

The ring laser gyro of the present invention may be driven by either a torque motor or by a piezoelectric driving arrangement. In another preferred embodiment, the wide, longitudinal surface of each web which form the second and third spring systems 18 and 20 is provided with a thin semiconductor chip formed from piezoelectric material. By impressing a voltage across these piezoelectric chips, they are forced to constrict or expand, in turn, causing the movement of the web and the gyro or counterweight attached thereto. While the gyro is shown with a rectangular laser path it can also be constructed with a triangular path, as discussed above. Clearly, other modifications and variations of the improved laser gyro dither mechanism described hereinabove will become apparent to those skilled in the art. Thus, the present invention should be limited only by the appended claims.

We claim:

1. An improved dither mechanism, comprising:
    a first body having first and second coaxial hub attachment fixtures;
    a second body having a first inner toroidal attachment fixture substantially concentric with said first hub attachment fixture;
    a third body having a second outer toroidal attachment fixture whose diameter is greater than said first toroidal attachment fixture and is substantially concentric with said first toroidal attachment fixture and said hub;
    a first spring system angularly flexibly connecting said first toroidal attachment fixture and said first hub attachment fixture for angular resilience therebetween;
    a second spring system angularly flexibly connecting said first and second toroidal attachment fixtures for angular resilience therebetween;
    a third spring system angularly flexibly connecting said second toroidal attachment fixture and said second hub attachment fixture for angular resilience therebetween.

2. An assembly as claimed in claim 1, in which:
    said first spring system comprises radially extending angularly flexible web means joining said first toroidal attachment fixture and said hub attachment fixture;
    said second spring system comprises second radially extending angularly flexible web means joining said second toroidal attachment fixture and said first toroidal attachment fixture;
    said third spring system comprises radially extending angularly flexible web means joining said second toroidal attachment fixture and said second hub attachment fixture.

3. An assembly as claimed in claim 2, wherein said first body is a ring laser body;
    said second body is a housing for a ring laser; p1 said third body is a counterweight;
    said first toroidal attachment fixture is rigidly attached to said housing;
    said first hub attachment fixture is rigidly attached to said second aligned hub attachment fixture; and
    said first and second toroidal attachment fixtures are rigidly attached together to form a gyro suspension system with said first, second and third spring systems arranged in a delta-configuration.

4. A laser gyro assembly as claimed in claim 3, wherein:
    said firt toroidal attachment fixture is a mid-toroidal ring mounted upon said housing with said first spring system extending inwardly and between said housing and said ring laser body;
    said second spring system extends outwardly from said mid-toroidal ring and is attached between said housing and said counterweight; and
    said third spring system is attached between said counterweight and said ring laser body wherein the three-spring system formed thereby is configured as a delta system between said housing, said ring laser body and said counterbalance for reducing the vibrational energy transmitted from the dithered ring laser gyro to said housing.

5. A laser gyro assembly having an improved dither mechanism, comprising:
    a first body comprising a ring laser body, a second body comprising a ring laser gyro case, a third body comprising a counterweight, and spring means angularly flexibly connected said first body to said second body, said first body to said third body and said second body to said third body.

6. A laser gyro assembly as claimed in claim 5, wherein said spring systems include a plurality of thin, wide, solid beams connected radially between said case and said counterweight, said case and said ring laser body, and said counterweight and said ring laser body.

7. An isolation system, comprising:
    a first body,
    means for vibrating said first body,
    third body means for counterbalancing the vibration of said first body,
    second body means for housing said first body and said third body means
    first, second and third spring systems for angularly flexibly connecting said first body, said third body means and said second body means allowing resilient relative angular rotation between said bodies, wherein the vibrational energy generated by said means for vibrating said first body is isolated from said second body means by said first, second and third spring systems.

8. An isolation system and dither mechanism as claimed in claim 1, 2, 3, 4, 5, 6 or 7, wherein:
said first spring system angularly flexibly connected said first body to said second body means,
said second spring system angularly flexibly connects said third body means for counterbalancing said first body, and
said first, second and third spring systems are connected between said bodies in a delta-configuration.

* * * * *